United States Patent
King

[15] 3,656,044
[45] Apr. 11, 1972

[54] BATTERY CHARGING APPARATUS
[72] Inventor: Ansel A. King, Route 3, Pelzer, S.C. 29669
[22] Filed: Oct. 27, 1970
[21] Appl. No.: 84,269

Related U.S. Application Data
[63] Continuation-in-part of Ser. No. 785,485, Dec. 20, 1968, abandoned.

[52] U.S. Cl. .................................. 320/2, 320/61, 322/1
[51] Int. Cl. ........................................................... H02k 5/00
[58] Field of Search .................. 320/61, 2, 15, 6, 25; 29/50; 322/1

[56] References Cited

UNITED STATES PATENTS

| | | |
|---|---|---|
| 3,457,491 | 7/1969 | Black et al. ........................... 320/61 X |
| 3,127,518 | 3/1964 | Pruitt .................................... 290/50 |
| 3,341,762 | 9/1967 | Rockoff ............................... 320/25 X |

Primary Examiner—J. D. Miller
Assistant Examiner—Robert J. Hickey
Attorney—Bailey and Dority

[57] ABSTRACT

A self-contained portable apparatus for charging dead batteries. The apparatus includes an alternator which is driven by a gasoline motor. A first circuit which includes cables extends from the alternator to the dead external battery. A charge initiating battery is mounted on the chassis, and is included in a second parallel circuit. The charge initiating battery energizes the alternator for causing such to begin charging the dead external battery. A third circuit is provided for regulating the voltage from said alternator so that the apparatus can be used to charge different potential batteries.

2 Claims, 2 Drawing Figures

Patented April 11, 1972

3,656,044

INVENTOR.
ANSEL A. KING

BY Bailey + Dority

ATTORNEYS

BATTERY CHARGING APPARATUS

This application is a continuation-in-part of my co-pending application Ser. No. 785,485, filed on Dec. 20, 1968, entitled "Battery Charging Apparatus," now abandoned.

This invention relates to a self-contained apparatus for charging a dead battery which is external to the apparatus, and more particularly to an apparatus which includes an alternator and a charge initiating battery which enables the alternator to charge a completely dead battery.

Battery boosting apparatus are well-known, and generally incorporate a generator and/or an auxiliary service battery for placing a charge on a dead battery. Normally, generators work satisfactorily, however, as is well-known, the R.P.M.'s of a generator must be greater than that of an alternator in order to produce substantially the same output. However, one of the problems with alternators is that normally they will not charge a completely dead battery.

There are many patents which show generators being used with an electrical circuit for charging batteries, such as illustrated in U.S. Pat. No. 3,343,057, granted to L. S. Smith on Sept. 19, 1967, and U.S. Pat. No. 3,341,762, granted to M. S. Rockoff on Sept. 12, 1967. These and many other devices incorporate a service battery, as well as auxiliary battery so that when one is weak a service man can switch to the stronger battery. As previously mentioned, these devices incorporate generators, therefore, they are not confronted with the problem of not being able to charge a completely dead battery as is the case with alternators.

Accordingly, it is an important object of the present invention to provide an economical and simple apparatus for charging dead batteries.

Another important object of the present invention is to provide a self-contained gasoline operated apparatus for charging completely dead batteries.

Still another important object of the present invention is to provide a self-contained portable apparatus for charging dead batteries which incorporates an alternator.

Still another important object of the present invention is to provide a self-contained apparatus for charging batteries which incorporates a switching arrangement that can be manipulated to place a charge initiating battery in parallel with the dead battery in order to initiate charging of the dead battery, as well as placing a voltage regulator in series with the charge initiating battery to regulate the voltage in order to provide an apparatus which can charge different potential batteries.

The construction designed to carry out the invention will be hereinafter described, together with other features thereof.

The invention will be more readily understood from a reading of the following specification, and by reference to the accompanying drawing forming a part thereof, wherein an example of the invention is shown and wherein.

Figure 1:
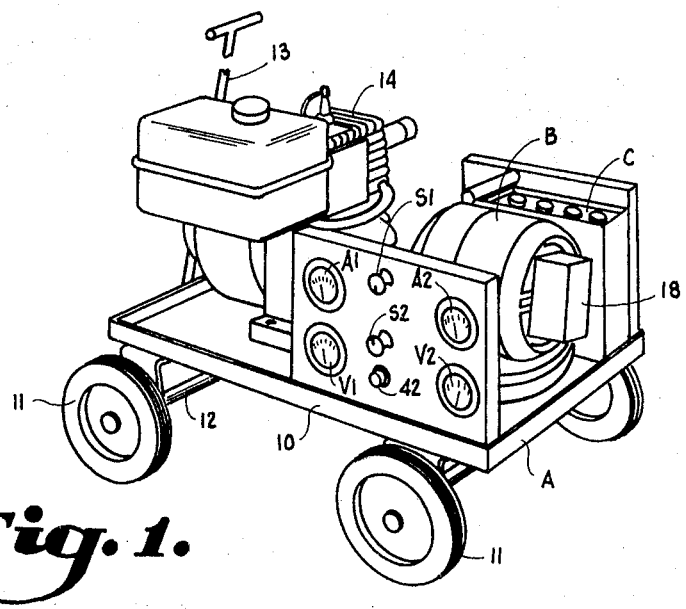
FIG. 1 is a perspective view of the self-contained portable apparatus.

The drawing illustrates a self-contained portable battery charging apparatus which can be conveniently carried to the site of a dead battery, which is to be charged. The apparatus is mounted on a small portable chassis A for charging a dead battery which is external to the apparatus. A low horsepower gasoline operated motor is mounted on the chassis A and has an output shaft to which an alternator is connected. A first circuit connects the dead battery to the alternator B and includes cables which extend from the alternator to the terminals of the dead battery. The charge initiating battery C is mounted on the chassis A. A second circuit connects the charge initiating battery C in parallel with the first circuit. A first switch means is interposed in the second circuit for selectively opening and closing the second circuit for energizing the alternator B to cause the alternator to charge the completely dead battery when closed. When the first switch means is closed current flows from the alternator to both the charge initiating battery C and the dead battery. After the alternator B begins charging the dead battery the first switch means can be opened disconnecting the charge initiating battery from the alternator. Thus, an efficient portable charging apparatus is provided for charging completely dead batteries at remote locations.

Figure 2:
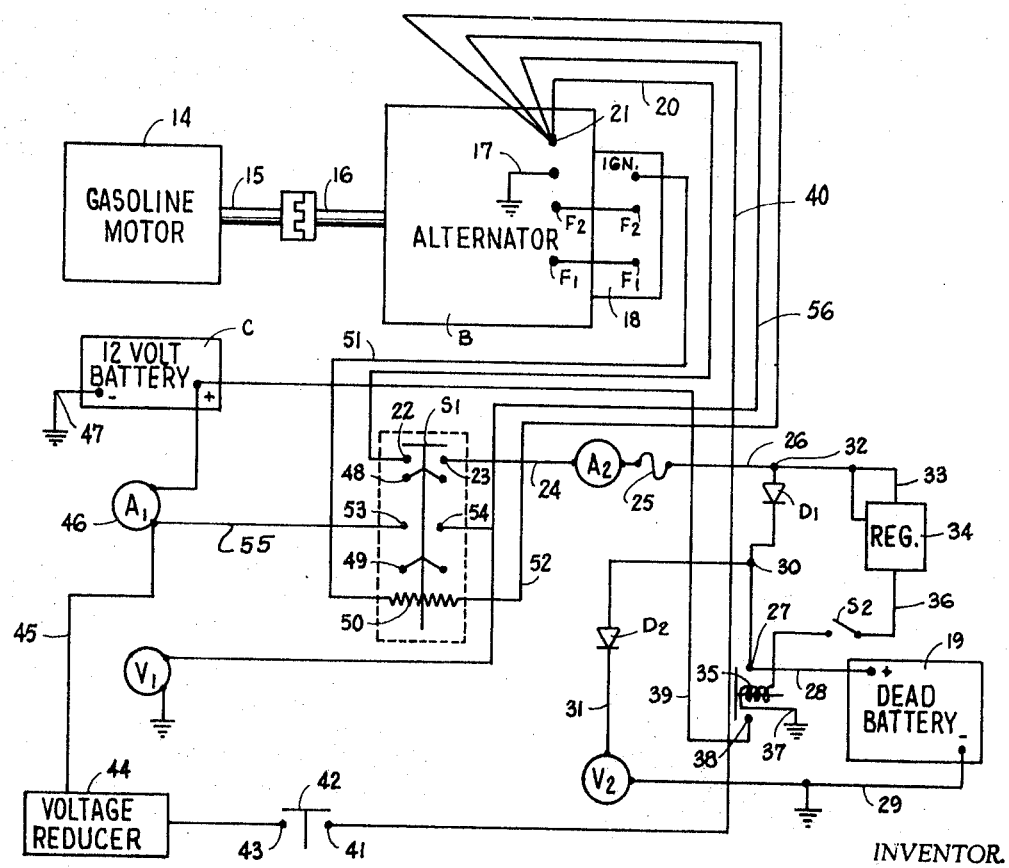
FIG. 2 is a schematic diagram, partially in block form of the apparatus depicted in FIG. 1.

Referring in more detail to the drawing, the chassis A upon which the apparatus is mounted, includes a substantially flat platform 10 which is suitably mounted on wheels 11. The front pair of wheels 11 are joined by an axle 12 which has a steering handle 13 coupled thereto, so that the apparatus can be guided as such is pulled to the desired location. The platform may be constructed of any suitable material, such as iron. A low 3½ horsepower gasoline powered motor 14 is suitably mounted on the platform 10 and has an output shaft 15 to which an input shaft 16 of the alternator B is coupled for rotating the alternator. The alternator B is grounded by lead 17 to the metal platform 10, and has a voltage regulator 18 attached thereto, for regulating the output voltage. The regulator 18 is wired to the alternator in the conventional manner, such as illustrated in FIG. 2. The alternator may be any suitable alternator, and one particular alternator being used is manufactured by C. E. Niehoff & Company of Chicago, Illinois, and has a Model No. A45-1. One suitable regulator is also manufactured by the C. E. Niehoff & Company, and has a Model No. of A-151.

A first circuit is provided for connecting the dead battery 19 which is to be charged to the alternator and includes lead 20 which extends from the output terminal 21 of the alternator to contact 22 of pull switch S1. The other contact 23 of switch S1 is coupled to an ammeter A2 via lead 24. The other side of the ammeter A is connected to a fuse 25 which is interposed in lead 26 and extends from the ammeter to the anode of diode D1. The cathode of diode D1 is coupled to a junction 27. A cable 28 extends from junction 27 and the positive terminal of the dead battery 19. This cable may have a clip on the end for conveniently coupling to the terminal of the dead battery. Another cable 29 is connected from the dead battery to ground, which in the particular embodiment illustrated is through the chassis A. A volt meter V2 is interposed in lead 31 which is connected between junction 30 and ground. Also, interposed in lead 31 is a diode D2 with the cathode thereof facing ground and the anode facing junction 30.

Connected in parallel with the first circuit is a regulated circuit which is connected to junction 32 interposed in lead 26. The regulating circuit includes lead 33 which is connected to a conventional regulator 34. The other side of the regulator 34 is connected to an electronic switch 35. Interposed in lead 36, which connects the regulator to the electronic switch 35, is a switch S2. The other side of the coil of the electronic switch is connected via lead 37 to ground. The electronic switch is provided for completing the circuit between junction 27 and junction 38. Junction 38 is coupled via lead 39 to the positive terminal of the charge initiating battery C. The negative terminal of the charge initiating battery C is grounded. The ammeter A2 in the circuit is provided for indicating the flow of current therethrough. The regulator 34 is provided for allowing current to flow through the leads 33 and 36 to close the electronic switch 37 when the voltage output of the alternator reaches a predetermined level. In one particular embodiment the regulator is a 12 volt regulator and is set to open the circuit when the output of the alternator reaches approximately 12 volts. When the electronic switch is closed bridging terminals 27 and 38, the 12 volt charge initiating battery C is in parallel with the dead battery 19.

Diode D2 interposed in lead 31 is provided to allow current flow only in one direction through the volt meter V2. Thus, by observing the needle in the volt meter V2, if the cables 29 and 28 are properly connected to the dead battery, it will give a reading during the charging operation. If the cables 28 and 29 are reversed the volt meter will have no readings, indicating an improper connection.

While it is desirable to use alternators for charging batteries, since a higher charging rate can be accomplished with a lower input R.P.M. than is necessary for a generator, one problem which is inherent with alternators is that such will not charge a completely dead battery. In order to overcome this problem, the apparatus constructed in accordance with the present invention incorporates a 12 volt charge initiating battery, such as used in a motor cycle. The charge initiating battery C is connected through the second circuit to the alternator B in parallel with the first circuit. The second circuit includes a lead 40 which extends from the output terminal 21 of the alternator to a first contact 41 of the first switch means 42. The other contact 43 of the first switch means 42 is connected to the voltage reducer 44 which may take the form of a resistor, lead 45, ammeter 46, to the positive terminal of the charge initiating battery C. The negative terminal of the charge initiating battery C is connected via lead 47 to ground. The first switch means 42 in the embodiment illustrated takes the form of a spring biased push button switch which is momentarily depressed to energize the field winding of the alternator so as to initiate the charging operation when the battery 19 is completely dead.

The switch S1 is a pull type switch and has two sets of contacts 48 and 49, respectively, thereon. The pull switch S1 also has a rheostat 50 connected to the bottom thereof for varying the current flow from the alternator. The rheostat 50 is connected via lead 51 to the ignition terminal of the regulator associated with the alternator. The other side of the rheostat 50 is connected via lead 52 to terminal 21 of the alternator. The switch S1 has an addition set of terminals 53 and 54, respectively, which are closed when the switch S1 is pulled out the maximum amount and contact 49 extends between the terminals 53 and 54. Connected to terminal 53 is lead 55 which goes through ammeter 46 to the positive terminal of the 12 volt battery C. Lead 56 connects terminal 54 to terminal 21 of the alternator so that when the switch S1 is pulled out to the second or outermost position, the alternator is allowed to charge the 12 volt charge initiating battery C.

In operation, if a battery in a vehicle, such as a truck or the like, is completely dead and is at a remote location the battery charging apparatus is transported to the location. The device may be rolled on the wheels 11 along side the vehicle having the dead battery therein. The gasoline motor is cranked by a pull rope or the like, causing the alternator to rotate. If the battery 19 is completely dead, the alternator will no not start charging. The operator would then momentarily depress the first switch means button 42 causing the charge initiating battery C to energize the field winding of the alternator. When the button 42 is depressed and switch S1 is pulled out to the first position wherein contact 48 bridges terminals 22 and 23 the charge initiating battery C is placed in parallel with the dead battery 19. Once the alternator starts putting out current the first switch means 42 can be released. Assuming that the dead battery 19 is a 12 volt battery and the regulator 34 is set at 12 volts, when the output of the alternator reaches approximately 12 volts the regulator will open the circuit allowing current to flow through lead 33, close switch S2, energizing electronic switch 35, causing such to close the connection between terminals 27 and 38. When this circuit is closed the charge initiating battery C is placed in parallel with the dead battery 19 and the alternator charges both of the batteries. If it is desired not to charge the charge initiating battery C, then the switch S2 may be opened. When it is desired to charge both the 12 volt battery C and the dead battery 19 simultaneously the switch S1 is pulled out to the first position wherein the contact 48 bridges the terminals 22 and 23.

If it is desired to charge only the charge initiating battery C, the switch S1 is pulled out to the second position wherein the contact 49 bridges terminals 53 and 54 closing the circuit to the 12 volt battery C through leads 55 and 56. The ammeters A1 and A2 show the current flowing to the charge initating battery C and the dead battery 19, respectively. The volt meters V1 and V2 show the voltage being supplied to the charge initiating battery C and the dead battery 19, respectively.

The circuit illustrated in FIG. 2 can be utilized to charge dead batteries of 6, 12 or 24 volts. The size of the dead battery controls the output of the alternator, and if the regulator is set for 12 volts, then it would only close the circuit leading to the 12 volt charge initiating battery C when the 12 volt battery was being charged. If a 6 volt battery was being charged the alternator would not put out sufficient voltage to allow the regulator 34 to close the electronic switch. If a 24 volt battery 19 was being charged, the high voltage would cause the regulator 34 to break the circuit leading to the electronic switch 35. The regulator may be any suitable conventional regulator.

While a preferred embodiment of the invention has been described using specific terms, such description is for illustrative purposes only, and it is to be understood that changes and variations may be made without departing from the spirit or scope of the following claims.

What is claimed is:

1. A self-contained portable battery charging apparatus which can be conveniently carried to the site of a dead battery which is to be charged, said dead battery being external to said apparatus comprising: a small portable chassis; a low horsepower gasoline operated motor mounted on said chassis having an output shaft; an alternator mounted on said chassis coupled to said output shaft of said motor; a first circuit connecting said dead battery to said alternator; said first circuit including cables extending from said alternator to the terminals of said dead battery; a charge initiating battery mounted on said chassis; a second circuit connecting said charge initiating battery in parallel with said first circuit; first manually operated switch means interposed in said second circuit for selectively opening and closing said second circuit for energizing a field winding of said alternator causing said alternator to charge said dead battery when closed, so that when said first switch means is closed current flows from said alternator to both said charge initiating battery and said dead battery and after said alternator begins charging said dead battery said first switch means can be opened disconnecting said charge initiating battery from said alternator while said motor and alternator continue charging said dead battery; whereby an efficient portable charging apparatus is provided for charging completely dead batteries at remote locations.

2. The battery charging apparatus as set forth in claim 1, further comprising: a voltage regulating circuit coupled to said first circuit for regulating the output voltage being supplied from said alternator to said dead battery.

* * * * *